United States Patent [19]

Nelle et al.

[11] 4,152,837
[45] May 8, 1979

[54] LENGTH MEASURING DEVICE

[75] Inventors: Günther Nelle, Siegsdorf; Alfons Ernst, Traunreut, both of Fed. Rep. of Germany

[73] Assignee: Dr. Johannes Heidenhain GmbH., Traunreut, Fed. Rep. of Germany

[21] Appl. No.: 815,092

[22] Filed: Jul. 13, 1977

Related U.S. Application Data

[63] Continuation of Ser. No. 637,596, Dec. 4, 1975, abandoned.

[30] Foreign Application Priority Data

Mar. 8, 1975 [DE] Fed. Rep. of Germany ....... 2510219

[51] Int. Cl.² .......................................... G01B 11/04
[52] U.S. Cl. ................................. 33/125 C; 356/374
[58] Field of Search .............. 33/125 C; 356/167, 169, 356/172

[56] References Cited

U.S. PATENT DOCUMENTS

| | | | |
|---|---|---|---|
| 2,886,717 | 5/1959 | Williamson et al. | 33/125 C X |
| 3,579,836 | 5/1971 | Kraus | 33/125 C X |
| 3,816,002 | 6/1974 | Weig | 356/172 X |
| 3,816,003 | 6/1974 | Litke | 33/125 C X |
| 3,867,037 | 2/1975 | Litke | 33/125 C |
| 3,899,255 | 8/1975 | Meier | 33/125 C X |

*Primary Examiner*—Charles E. Phillips
*Attorney, Agent, or Firm*—Ernest F. Marmorek

[57] ABSTRACT

A displacement measuring system for measuring relative displacements between two members. The second member is free to move relative to the first member along a main guide. The first member has a scale element which tracks the main guide. The second member is coupled to a scanner which moves along its own guide (which may be constituted by the scale element itself) scanning the scale element to provide a measure of the relative displacement. The coupling is flexible in directions at right angles to the direction of relative displacement in order to compensate for tracking errors between the main guide and the scale.

An embodiment in which the scale is located off the neutral axis of the scale element the coupling is flexible in a first plane on the level of the neutral axis and in a second plane which includes the longitudinal central axis of the scale and is at right angles to the first plane.

6 Claims, 7 Drawing Figures

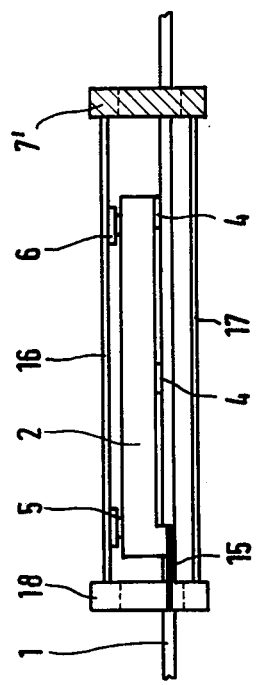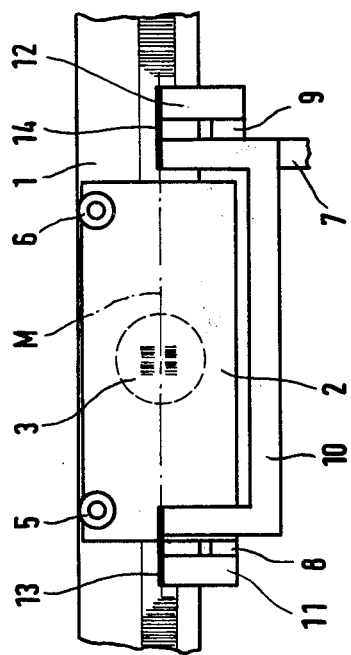

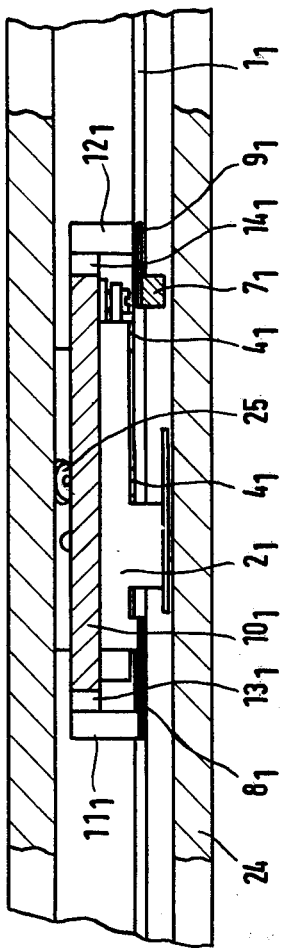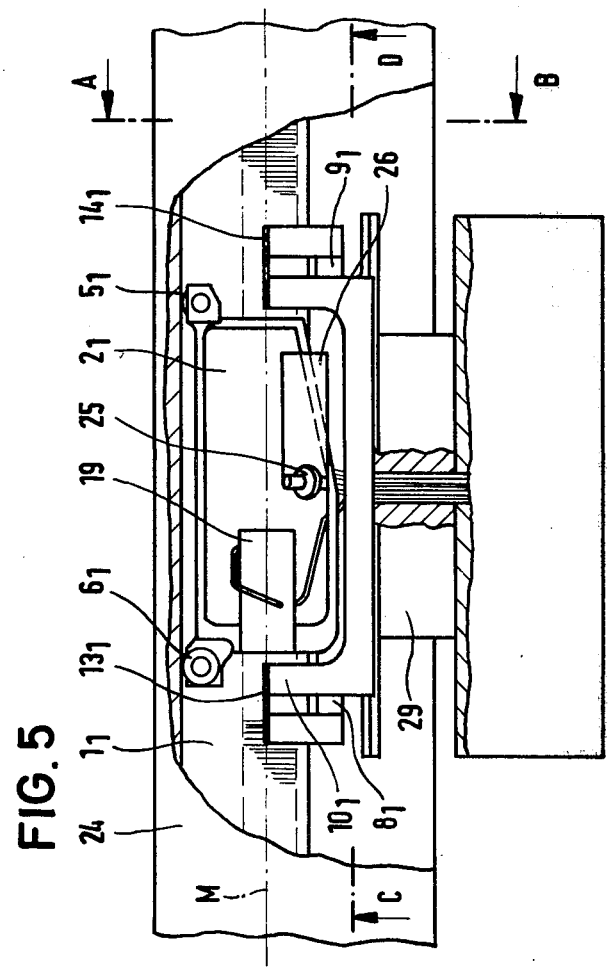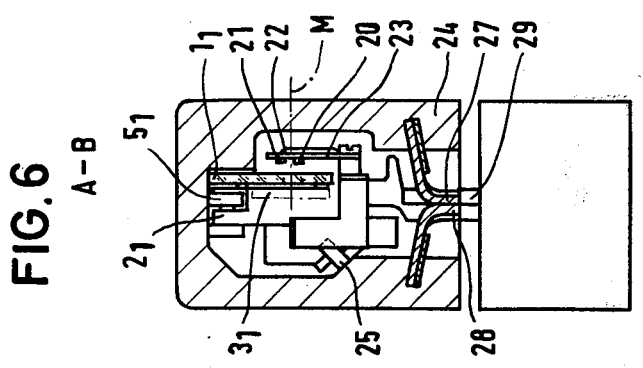
FIG. 7 C-D
FIG. 5
FIG. 6 A-B

LENGTH MEASURING DEVICE

This is a continuation, of application Ser. No. 637,596, filed Dec. 4, 1976 now abandoned.

The invention relates to a length measuring arrangement having a scale the divisions of which are located outside the neutral axis and are scanned by a scanning unit coupled to the object to be measured and slidable along an auxiliary guide independent of the guide of object to be measured. The object to be measured may be the slide of a processing or measuring machine.

In known length measuring arrangements having a scale the divisions of which are located outside the neutral axis, bending or distortion of the scale in its position of use causes measuring errors.

The problem of the invention is to provide a length measuring arrangement of the kind mentioned at the beginning which is equivalent as regards accuracy of measurement to a measuring arrangement having divisions located in the neutral axis of the scale body, but is moreover distinguished by a simple type of construction.

The invention solves the problem posed in that the scanning unit is so coupled to the object to be measured, or rather to a driving member mounted thereon, by interposing flexible-coupling-like elements that compensation of errors caused by distortions of the scale and/or inaccuracies of guiding of the scanning unit is effected.

According to the invention, compensation of errors which are caused by distortions of the scale is effected in that the scanning unit is supported directly on that surface of the scale which carries the divisions and is flexibly coupled to the driving member level with the neutral axis of the scale.

According to another feature of the invention, a particularly high precision of measurement can be achieved in that the scanning unit, on which, for example, a grating scanning plate is mounted, is flexibly coupled to the driving member in a first plane at the same height as the neutral axis of the scale body and is flexibly coupled to the driving member in a second plane located at right angles to the first plane and at the same height as the central axis, extending in the direction of measurement, of the divisions of the grating scanning plate. By means of this coupling system, compensation of errors caused by distortions or deformations of the scale in its position of use and by inaccuracies of guiding of the scanning unit is effected.

Other features of the invention will be apparent from the claims.

Embodiments of the length measuring arrangement according to the invention are shown in the drawing.

In the drawing:

FIG. 1 shows diagrammatically a first embodiment of the coupling system according to the invention;

FIG. 2 is a side view corresponding to FIG. 1;

FIG. 3 shows another embodiment of the coupling system according to the invention;

FIG. 4. is a side view corresponding to FIG. 3;

FIG. 5 shows the coupling system according to the invention in the case of an enclosed digital length measuring arrangement;

FIG. 6 is a section on the line A–B of FIG. 5;

FIG. 7 is a section on the line C–D of FIG. 5.

In FIGS. 1 and 2 the reference 1 designates the grating scale of an incremental measuring arrangement. The scanning unit 2, which carries the grating scanning plate 3, is supported directly on the grating scale 1 via sliding shoes 4. The illuminating device and the photoelectronic components are also provided on the scanning unit 2. In the plane at right angles to the plane of the divisions of the grating scale 1, the scanning unit 2 is guided on the main guide carrier or holder 24 of the grating scale 1 via rollers 5, 6. In FIG. 5, this carrier is a bending-resistant hollow body 24 to which the grating scale 1 is secured. The scanning unit 2 is coupled to the object to be measured, for example a machine table, via a driving member 7. According to the invention, coupling is effected in that the scanning unit 2 is flexibly coupled to the driving member 7 at the same height as the neutral axis or plane of the grating scale 1. In FIG. 1, the flexible coupling is formed by flat springs 8 and 9 the central axis of which is at the same height as the neutral axis of the grating scale 1. The flat spring 8 is fixed to the scanning unit 2 and to an angular member 11. The flat spring 9 is mounted between the driving member 7 and an angular member 12. This coupling of the scanning unit 2 at the same height as the neutral axis of the grating scale 1 compensates errors which are caused by distortions of the grating scale 1. Such distortions may already occur, for example, when the grating scale 1 is fixed in its mounting support.

A particularly high accuracy of measurement can be achieved through another coupling measure in that the scanning unit 2 is flexibly coupled to the driving member 7 in a second plane located at right angles to the above-mentioned neutral plane and at the same height as the central axis M of the grating divisions of scanning plate 3 and of the grating scale 1, this central axis extending in the direction of measurement. The flexible couplings are again formed by flat springs 13 and 14 which are mounted level with the central axis M of the grating scanning plate 3. The flat springs 13 and 14 are fixed to a U-shaped connecting member 10 and to the angular members 11 and 12. As a result of this coupling of the scanning unit 2 at the same height as the central axis M of the grating divisions of the scanning plate 3, errors which are caused by inaccuracies of guiding of the scanning unit 2 in the plane at right angles to the plane of the divisions of the grating scale 1 can also be compensated.

FIGS. 3 and 4 show an embodiment in which the scanning unit 2 is flexibly coupled to a driving member 7' by means of a flat spring 15 at the same height as the neutral axis of the grating scale 1. In the other plane at right angles to this plane, both planes containing the imaginary line M of the grating scale 1; however, the scanning unit 2 is flexibly coupled to the U-shaped driving member 7' by means of buckling-resistant wires 16 and 17 at the same height as the central axis M of the grating divisions of the scanning plate 3. The flat spring 15 is fixed to the scanning unit 2 and to a U-shaped member 18 to which the wires 16 and 17 are also fixed.

FIGS. 5 to 7 show a photoelectric length measuring arrangement of enclosed type, in which the coupling principle illustrated in FIG. 1 is applied with particular advantage. The divisions of the grating scale $1_1$ and the divisions of the grating scanning plate $3_1$ are illuminated by means of a lamp by way of a condenser. The illuminating device 19, which contains the lamp and the condenser, is mounted on the scanning unit $2_1$. The light penetrating the gratings $1_1$, $3_1$ is made to impinge onto photoelectric cells 20, 21 (FIG. 6). The electric output signal of the photoelectric cells 20, 21 is fed via the outputs 22, 23 directly to an electronic forward and backward counter (not shown) of the type described in German Utility Model 7,413,290.

For the purpose of shielding the grating scale $1_1$ and the scanning unit $2_1$ from environmental influences, they are installed in a bending-resistant hollow body 24 which is advantageously made of extruded aluminum. The grating scale $1_1$ is secured to the hollow body 24 by cementing. The scanning unit $2_1$ is guided directly on the grating scale $1_1$ via sliding shoes $4_1$ and on the hollow body 24 via ball bearings $5_1$, $6_1$. A ball bearing 25 which is mounted on the scanning unit $2_1$ by means of a flat spring 26 and is supported on the hollow body 24 presses the scanning unit $2_1$ against the guide surfaces on the grating scale $1_1$ and the hollow body 24. The hollow body 24 is closed by means of flexible sealing lips 27, 28 arranged in roof shape and through which a slender sword-like driving member 29 extends.

The coupling of the scanning unit $2_1$ to the driving member 29 is effected as in FIGS. 1 and 2 by means of flat springs $8_1$ and $9_1$ and $13_1$ and $14_1$, respectively. The flat springs $8_1$ and $9_1$ are arranged at the same height as the neutral axis of the grating scale $1_1$. By means of this coupling system, errors which are caused by distortions of the grating scale $1_1$ can be compensated. The flat springs $13_1$ and $14_1$ are arranged at the same height as the central axis M of the grating scanning plate $3_1$. By means of this coupling system, errors which are caused by inaccuracies of the guide path on the hollow body 24 can be compensated. The flat spring $8_1$ is fixed to the scanning unit $2_1$ and to the angular member $11_1$, while the flat spring $9_1$ is arranged on the angular member $12_1$ and the projecting part $7_1$ of the sword-shaped driving member 29. The flat springs $13_1$ and $14_1$ are fixed to the angular members $11_1$ and $12_1$ and to a U-shaped connecting member $10_1$.

The invention is not limited to the photoelectric measuring arrangement shown, but can naturally also be applied in optical, inductive and capacitive measuring arrangements.

What is claimed is:

1. A displacement measuring system for use in measuring relative displacement between two objects, comprising, in combination:
    a main guide;
    a first member adapted to be secured to one of said objects through said main guide; and including a scale element having a neutral plane and having a series of scale divisions indicated thereon, said scale divisions being spaced apart from said neutral plane and being disposed near said main guide;
    a second member movable relative to said first member;
    a scanning means comprising a scanning unit guide and a scanning unit movable along said first member along a given imaginary line and operable for scanning said scale element; and
    coupling means operable for coupling said scanning unit to said second member stiffly with respect to movement parallel to said line, and resiliently at right angles thereto, said coupling means comprising at least two substantially parallel and buckling-resistant wire rods whereby said scanning unit is able to move along said first member independently of distortions which might occur to prevent said scanning unit from tracking said scale element precisely.

2. A displacement measuring system according to claim 1, further comprising a U-shaped member, wherein said scanning unit is connected to said wire rods by said U-shaped member embracing the scale element, said scanning unit being connected to said U-shaped member by said flexible element.

3. A displacement measuring system for use in measuring relative displacement, between two objects, comprising in combination,
    a main guide;
    a first member, adapted to be secured to one of said objects through said main guide; and including a scale element having a neutral plane and having a series of scale divisions indicated thereon, said scale divisions being spaced apart from said neutral plane and being disposed near said main guide;
    a second member movable relative to said first member;
    a scanning means comprising a scanning unit guide and a scanning unit movable along said first member long a given imaginary line and operable for scanning said scale element; and
    coupling means operable for coupling said scanning unit to said second member stiffly with respect to movement parallel to said line and resiliently at right angles thereto, said coupling means comprising first and second pairs of flexible elements and a plurality of rigid members, the flexible elements of said first and second pairs being oriented in respective first and second planes transverse to one another, said flexible elements being interconnected by said rigid members, whereby said scanning unit is able to move along said first member independently of distortions which might occur to prevent said scanning unit from tracking said scale element precisely.

4. A displacement measuring system according to claim 3, wherein said main guide is a hollow body and further comprising a driving element, said scale element, said scanning unit and said coupling means being enclosed within said body, said body defining a slot through which said driving element provides a coupling between said coupling means and said second member.

5. A displacement measuring system according to claim 4 wherein said scale element is defined by a portion of said body.

6. A displacement measuring system according to claim 5, wherein said scanning unit includes a roller obliquely disposed to the plane of the scale element and mounted on said scanning unit to press resiliently against a cooperating surface of said body to maintain said scanning unit properly engaged with said scale element.

* * * * *